No. 891,870. PATENTED JUNE 30, 1908.
D. J. SHULTZ.
SLED PROPELLER.
APPLICATION FILED OCT. 30, 1907.

Inventor
Daniel J. Shultz

Witnesses
Hugh H. Ott
J. F. Byrne

By Victor J. Evans
Attorney

UNITED STATES PATENT OFFICE.

DANIEL J. SHULTZ, OF SALT LAKE CITY, UTAH.

SLED-PROPELLER.

No. 891,870.

Specification of Letters Patent.   Patented June 30, 1908.

Application filed October 30, 1907.   Serial No. 399,923.

*To all whom it may concern:*

Be it known that I, DANIEL J. SHULTZ, a citizen of the United States of America, residing at Salt Lake City, in the county of Salt Lake and State of Utah, have invented new and useful Improvements in Sled-Propellers, of which the following is a specification.

My invention relates to sled propellers, and its primary object is to provide a device of this character which can be easily applied to the sleds already in use, which is simple, durable and efficient, and which can be manufactured and sold at a comparatively low cost.

Figure 1:
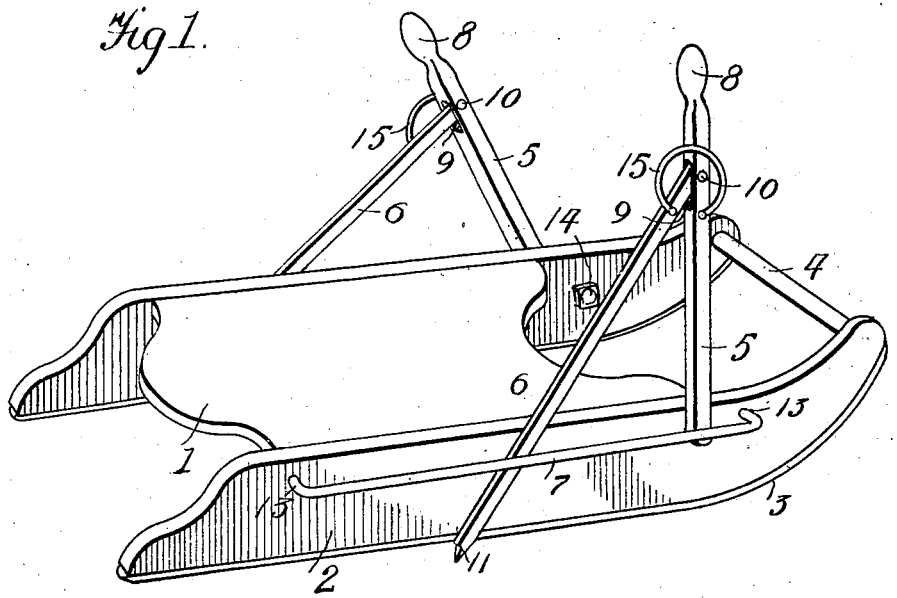
Figure 2:
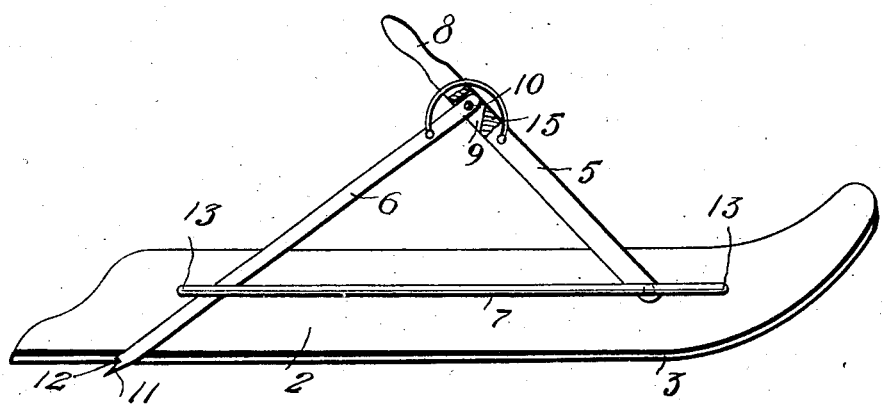

With the above and other objects in view, the invention consists in the construction, combination and arrangement of parts hereinafter fully described, claimed and illustrated in the accompanying drawing, wherein:

Figure 1 is a perspective view illustrating the application of my improved propeller, and Fig. 2 is a view in side elevation thereof.

Referring to the drawing by reference numerals, 1 designates the seat, 2 the sides and 3 the runners of a sled of the usual construction and form, the sled being provided with a foot rest 4.

My improved propeller consists of a power lever 5, a push rod 6 and a guard 7. The power lever 5 is pivotally secured at its relative lower end to the side 2 of the sled, and has its relatively upper end formed to provide a handle 8. The power lever 5 is provided at a point adjacent the handle 8 with a recess 9, the relatively upper and lower walls of which are inclined in reverse directions, as fully shown in Fig. 2 of the drawing. The push rod 6 is pivotally secured at one end to the power lever 5 by means of a pin 10, the end of the push rod 6 being disposed within the recess 9. The free end of the push rod 6 is formed to provide a spur 11 adapted to penetrate the snow or ice, and a shoulder 12 adapted to limit the degree of penetration of the spur. The guard 7 is provided with angularly disposed portions 13 by means of which it is secured to the side of the sled, said portions being threaded to permit of the application of retaining nuts 14.

In practice, a sled is equipped with two of the propellers which are operated by rocking the power levers 5 in a forward and backward direction. The forward movements of the power levers 5 position the spurs 11 in engagement with the snow or ice at points adjacent the forward end of the sled, and the rearward movements thereof propel the sled forwardly. It should be thus apparent that the rapid manipulation of the power lever 5 will impart considerable velocity to the sled. The guard 7 prevents the lateral displacement of the push rods 6 during the operation of the propellers. The upper relative walls of the recess 9 are adapted to engage the push rods 6 and thus limit the rearward movements of the power levers 5, as clearly shown in Fig. 2 of the drawing. Each propeller is provided with a bowed spring 15, the terminals of which are connected respectively to the power lever and push rod, as shown. These springs normally tend to maintain the spurs 11 in contact with the surface over which the sled is moving and are tensioned to move the push rods in the direction of the power levers. The movements of the push rods 6 by the springs 15 are limited by the push rods coming in contact with the relatively lower walls of the recesses 9. When it is desired to guide the sled, one of the propellers is held in the position shown in Fig. 2, and when it is desired to retard the velocity of the sled, both of the levers are held in such position.

From the foregoing description taken in connection with the accompanying drawing, the construction and mode of operation of the invention should be understood without a further extended description.

Changes in the form, proportions and minor details of construction may be made within the scope of the claims without departing from the spirit or sacrificing any of the advantages of the invention.

Having fully described and illustrated my invention, what I claim is:

A sled propeller comprising a power lever formed with a recess and pivotally connected to the sled, a push rod pivotally mounted within the recess, the upper and lower walls of said recess being inclined to form stops to be engaged by the push rod and limit the movement of said rod in each direction, and a spring connecting the rod and lever and tensioned to normally maintain the rod in engagement with one of said recess walls.

In testimony whereof I affix my signature in presence of two witnesses.

DANIEL J. SHULTZ.

Witnesses:
ALLEN GILLESPIE,
RALPH D. POMEROY.